(12) United States Patent
Kumon

(10) Patent No.: US 11,584,230 B2
(45) Date of Patent: Feb. 21, 2023

(54) IN-VEHICLE INTERFACE DEVICE AND VEHICLE

(71) Applicant: Toyota Jidosha Kabushiki Kaisha, Toyota (JP)

(72) Inventor: Hitoshi Kumon, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 16/942,120

(22) Filed: Jul. 29, 2020

(65) Prior Publication Data
US 2021/0094419 A1  Apr. 1, 2021

(30) Foreign Application Priority Data
Oct. 1, 2019   (JP) .............................. JP2019-181572

(51) Int. Cl.
*B60K 35/00*  (2006.01)
*B60W 50/10*  (2012.01)
(Continued)

(52) U.S. Cl.
CPC ............ *B60K 35/00* (2013.01); *B60W 10/04* (2013.01); *B60W 10/20* (2013.01); *B60W 50/10* (2013.01);
(Continued)

(58) Field of Classification Search
CPC .............. B60K 35/00; B60K 2370/128; B60K 2370/152; B60K 2370/166; B60K 2370/782; B60K 37/06; B60W 10/04; B60W 10/20; B60W 50/10; B60W 50/14; B60W 60/00; B62D 1/046; B62D 1/06; B62D 1/08; B62D 1/10
See application file for complete search history.

(56) References Cited

U.S. PATENT DOCUMENTS

2012/0283914 A1*  11/2012  Karwaczynski ....... B60K 35/00
                                                   701/41
2013/0050114 A1*   2/2013  Backman ............... B60K 37/02
                                                   345/173
(Continued)

FOREIGN PATENT DOCUMENTS

| JP | 2016-216022 A | 12/2016 |
| JP | 2017-178009 A | 10/2017 |
| JP | 2019-077427 A | 5/2019 |

*Primary Examiner* — James J Lee
*Assistant Examiner* — Andrew Sang Kim
(74) *Attorney, Agent, or Firm* — Dinsmore & Shohl LLP

(57) ABSTRACT

An interface device to be mounted on an autonomous vehicle includes: a right operation switch and a left operation switch provided on a steering wheel; a display device disposed ahead of the steering wheel; and an IF controller configured to control the display device, the controller being configured to cause the display device to display an intention confirmation image when it is necessary to confirm a driver's intention regarding autonomous travel. The intention confirmation image includes an inquiry image, a right guide image displayed on the right side of a horizontal center of the inquiry image, the right guide image indicating a choice selectable with the right operation switch, and a left guide image displayed on the left side of the horizontal center of the inquiry image, the left guide image indicating a choice selectable with the left operation switch.

8 Claims, 12 Drawing Sheets

(51) Int. Cl.

| | |
|---|---|
| *B60W 10/04* | (2006.01) |
| *B60W 50/14* | (2020.01) |
| *B60W 10/20* | (2006.01) |
| *B62D 1/10* | (2006.01) |
| *B62D 1/06* | (2006.01) |
| *B62D 1/08* | (2006.01) |
| *B62D 1/04* | (2006.01) |

(52) U.S. Cl.
CPC ............. *B60W 50/14* (2013.01); *B62D 1/046* (2013.01); *B62D 1/06* (2013.01); *B62D 1/08* (2013.01); *B62D 1/10* (2013.01); *B60K 2370/175* (2019.05); *B60W 2050/146* (2013.01)

(56) References Cited

U.S. PATENT DOCUMENTS

| | | | | |
|---|---|---|---|---|
| 2016/0023553 | A1* | 1/2016 | Akita | G08G 1/0969 |
| | | | | 701/29.1 |
| 2017/0282935 | A1* | 10/2017 | Fujimoto | B60K 28/06 |
| 2018/0074497 | A1 | 3/2018 | Tsuji et al. | |
| 2018/0093676 | A1* | 4/2018 | Emura | G05D 1/0257 |
| 2020/0331529 | A1* | 10/2020 | Kawai | B60K 37/06 |

\* cited by examiner

FIG. 6
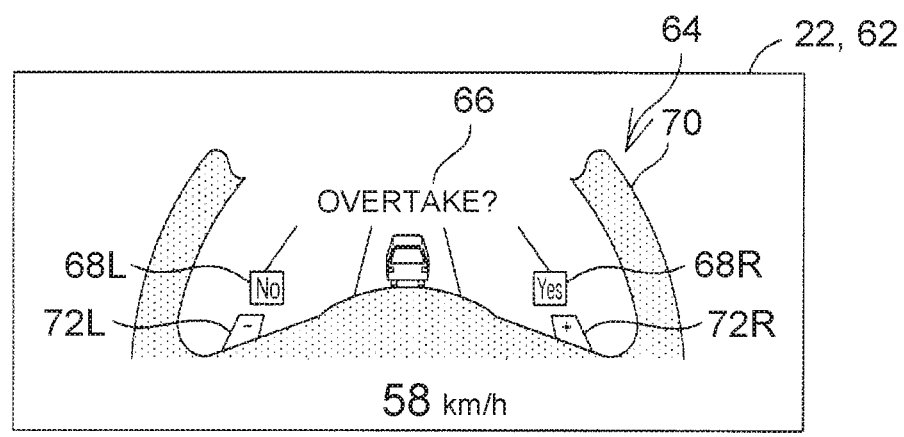
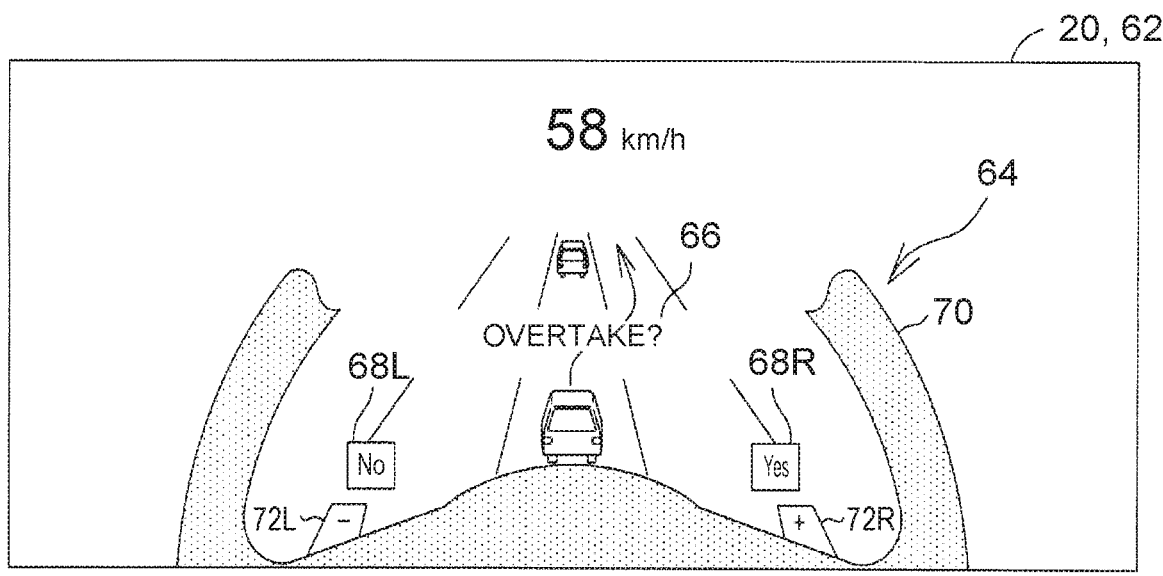

FIG. 7
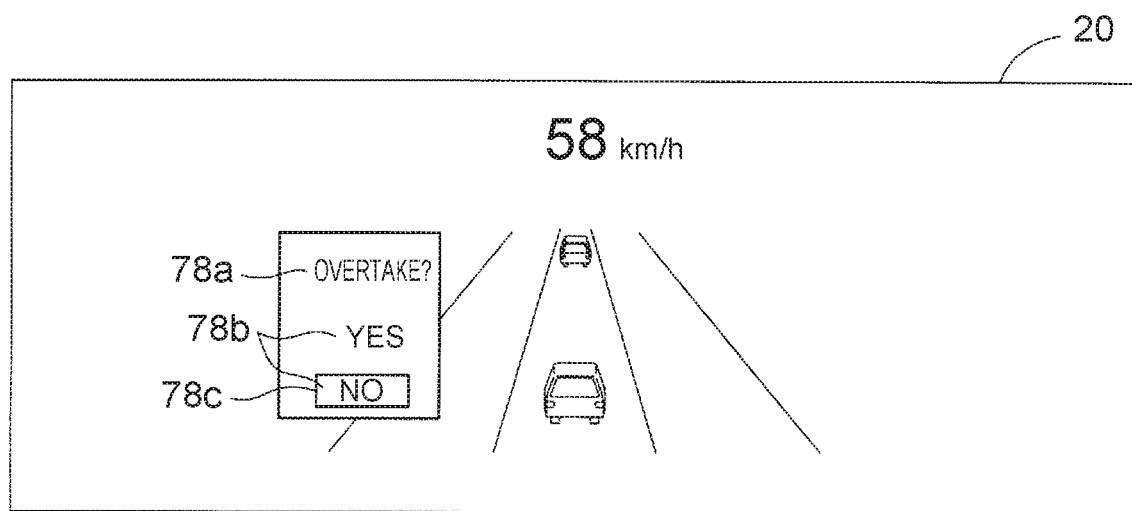
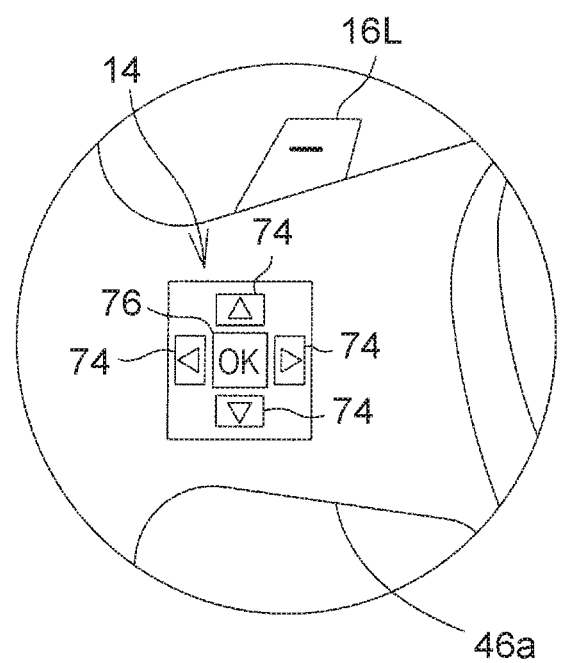

IN-VEHICLE INTERFACE DEVICE AND VEHICLE

CROSS-REFERENCE TO RELATED APPLICATIONS

This application claims priority to Japanese Patent Application No. 2019-181572 filed on Oct. 1, 2019, which is incorporated by reference in its entirety, including the specification, drawings and abstract.

BACKGROUND

1. Technical Field

This specification discloses an in-vehicle interface device, to be mounted in a vehicle that can perform autonomous travel that is to travel while controlling at least steering and acceleration and deceleration on the vehicle side, and a vehicle having the in-vehicle interface device.

2. Description of Related Art

In recent years, vehicles are known which travel while controlling steering and acceleration and deceleration of the vehicles on the vehicle side. Such vehicles include automated driving vehicles which execute all the dynamic operation control tasks on the vehicle side, as well as advanced driver assistance vehicles which execute steering and acceleration and deceleration of the vehicles on the vehicle side. Hereinafter, the automated driving vehicles and the advanced driver assistance vehicles are collectively referred to as "autonomous vehicles".

In such autonomous vehicles, it is sometimes necessary to confirm a driver's intention even during autonomous travel. For example, when an autonomous vehicle travels autonomously by following a leading vehicle, and the travel speed of the leading vehicle is slower than a preset speed, the autonomous vehicle needs to confirm the intention of the driver regarding the necessity of overtaking the leading vehicle. In order to respond to such inquiry regarding the driver's intention from the vehicle, in-vehicle interface devices have been proposed.

For example, Japanese Patent Application Publication No. 2019-77427 discloses an in-vehicle interface device including a notification output unit that notifies a control content regarding autonomous driving to a driver, and a response receiver that receives a driver's response to the notification. In the interface device, the control content is notified to the driver by switching lighting state of LEDs of two colors. The driver's intention to "approve start and travel" or "disapprove travel, and stop" can be input to the vehicle side by operating two paddle shift switches provided on the steering wheel.

SUMMARY

However, JP 2019-77427 A notifies the control state by only the lighting state of the LEDs. Therefore, in order to understand the notification content, the driver needs to learn the correspondence between the lighting state of the LEDs and the control state in advance. The driver also needs to learn how to operate a handler to notify the driver's intention to the vehicle side. In short, in the interface device disclosed in JP 2019-77427 A, the driver has to learn how to operate in advance, and when learning is not sufficient, the driver may fail to properly respond to an inquiry from the vehicle.

Accordingly, the present specification discloses an in-vehicle interface device that enables a driver to certainly and correctly respond to an inquiry from a vehicle side, and a vehicle mounted with the interface device.

The in-vehicle interface device disclosed in the present specification is an in-vehicle interface device to be mounted in a vehicle that can perform autonomous travel that is to travel while controlling at least steering and acceleration and deceleration on the vehicle side. The in-vehicle interface device includes: a right operation switch; a left operation switch; one or more display devices; and an interface controller. The right operation switch is provided on a steering wheel, the right operation switch being disposed on a right side of the center of the steering wheel in a vehicle width direction at a time of viewing a front side of the vehicle from a vehicle cabin. The left operation switch is disposed on a left side of the center of the steering wheel. The one or more display devices are disposed ahead of the steering wheel. The interface controller is configured to control the one or more display devices, the interface controller being configured to cause the display devices to display an intention confirmation image when it is necessary to confirm a driver's intention regarding the autonomous travel. The intention confirmation image includes an inquiry image indicating a content of an inquiry to the driver in an alternative form, a right guide image displayed on a right side of a horizontal center of the inquiry image, the right guide image indicating a choice selectable with the right operation switch, and a left guide image displayed on a left side of the horizontal center of the inquiry image, the left guide image indicating a choice selectable with the left operation switch.

When it is necessary to confirm a driver's intention, a right guide image indicating a choice selectable with the right operation switch is displayed on the right side, and a left guide image indicating a choice selectable with the left operation switch is displayed on the left side with a horizontal center of the inquiry image as a reference. This enables the driver to intuitively understand the correspondence between each of the operation switches and each of the choices. As a result, the driver can certainly and correctly respond to the inquiry from the vehicle side.

In this case, the inquiry image, the right guide image, and the left guide image may each include a character string indicating the corresponding content of the inquiry or the corresponding choice.

With this configuration, the driver can more certainly recognize the content of the inquiry, and the correspondence between the choices and the operation switches.

The intention confirmation image may further include a wheel image indicating at least some part of the steering wheel, and a right switch image and a left switch image indicating the right operation switch and the left operation switch provided on the steering wheel, respectively. The right guide image may be displayed so as to be positioned in a vicinity of the right switch image, and the left guide image may be displayed so as to be in a vicinity of the left switch image, with the steering wheel being viewed from a front side of the steering wheel.

With this configuration, the driver can more intuitively understand the correspondence between each of the operation switches and each of the choices.

In this case, the right switch image and the left switch image may be highlighted in contrast with the wheel image.

With this configuration, the driver can more certainly understand the position of the switches to operate for the inquiry.

The right operation switch and the left operation switch may be paddle shift switches operated when shift change is performed.

With this configuration, cost reduction can be achieved since it is not necessary to newly provide a switch for responding to the inquiry from the vehicle side.

In this case, the in-vehicle interface device may cancel a function of the shift change by operation of the right operation switch and the left operation switch at least during a period when the intention confirmation image is displayed.

With this configuration, an unexpected shift change relating to the operation of the right operation switch and the left operation switch can be prevented.

The steering wheel may include a round rim, a hub located at the center of the rim, and a lateral spoke extending in a horizontal direction from the hub and connecting to the rim. The right operation switch and the left operation switch may be disposed on a back surface of the lateral spoke.

With this configuration, the driver can easily operate the right operation switch and the left operation switch.

The right operation switch and the left operation switch may be mounted with auxiliary light sources that are lit in colors different from each other. The interface controller may light the auxiliary light sources in parallel with displaying the intention confirmation image. The right guide image and the left guide image may include images depicted in colors identical to the auxiliary light sources mounted on the corresponding operation switches, respectively.

With this configuration, the driver can more intuitively understand the correspondence between each of the operation switches and each of the choices.

A vehicle disclosed in the present specification includes an automated driving controller; and an in-vehicle interface device. The automated driving controller is configured to control at least steering and acceleration and deceleration of the vehicle. The in-vehicle interface device is configured to receive an instruction input from a driver. The in-vehicle interface device includes a right operation switch; a left operation switch; one or more display devices; and an interface controller. The right operation switch is provided on a steering wheel, the right operation switch being disposed on a right side of the center of the steering wheel in a vehicle width direction at a time of viewing a front side of the vehicle from a vehicle cabin. The left operation switch is disposed on a left side of the center of the steering wheel. The one or more display devices is disposed ahead of the steering wheel. The interface controller is configured to control the one or more display devices, the interface controller being configured to cause the display devices to display an intention confirmation image when it is necessary to confirm a driver's intention regarding an autonomous travel. The intention confirmation image may include an inquiry image indicating a content of an inquiry to the driver in an alternative form, a right guide image displayed on a right side of a horizontal center of the inquiry image, the right guide image indicating a choice selectable with the right operation switch, and a left guide image displayed on a left side of the horizontal center of the inquiry image, the left guide image indicating a choice selectable with the left operation switch.

The interface device and the vehicle disclosed in the present specification enables a driver to certainly and correctly respond to an inquiry from the vehicle side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 shows image views of the meter display and the HUD during an event;

FIG. 7 is an image view showing an example of a conventional intention confirmation response;

DETAILED DESCRIPTION OF EMBODIMENTS

Figure 1:
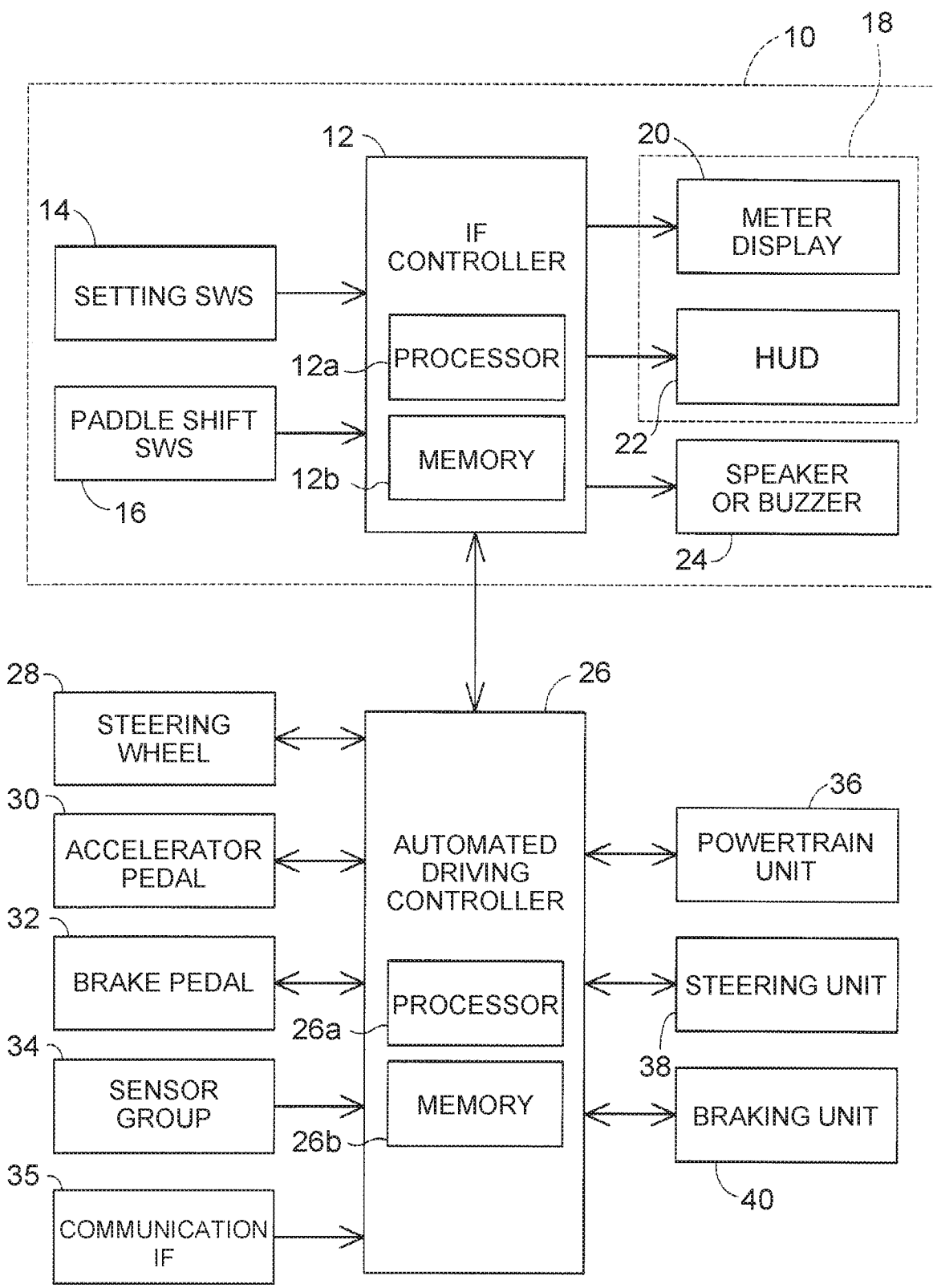
FIG. 1 is a block diagram showing the configuration of a vehicle.

Hereinafter, with reference to the drawings, an interface device 10 and a vehicle mounted with the interface device 10 will be described. FIG. 1 is a block diagram showing the configuration of the vehicle. In the following description, unless otherwise specified, "front and rear sides", "upper and lower sides", and "right and left sides" refer to the front and rear sides, the upper and lower sides, and the right and left sides of the vehicle. In each of the drawings, "Fr", "Up", and "R" refer to a front side, an upper side, and a right side, respectively.

The vehicle of the present example is an automated driving vehicle or an advanced driver assistance vehicle that can perform autonomous travel that is to travel while controlling steering and acceleration and deceleration on the vehicle side. Here, the term "advanced driver assistance" corresponds to the level 2 defined by Society of Automotive Engineers (SAE) of the U.S., for example. In the level 2, the vehicle supports driving by achieving cooperation between both the steering and the acceleration and deceleration. For example, in the level 2, the vehicle is made to travel autonomously under a specific condition by achieving cooperation between a lane keeping assist function and an adaptive cruise control function. The lane keeping assist function controls steering to keep the vehicle in the vicinity of the center of a travel lane. The adaptive cruise control function performs automatic control of an inter-vehicle distance with a preceding vehicle. In the level 2, the vehicle side further executes an overtaking operation of a preceding vehicle when the preceding vehicle is slower than a specified rate, a branching and merging operation on a highway, and the like.

The term "automated driving" corresponds to any one of the level 3 to the level 5 defined by SAE, for example. The level 3 corresponds to the driving form in which in specific places such as highways, all the dynamic driving control tasks are automated, although driver operation is necessary in emergency. The level 4 corresponds to the driving form in which in the specific places, all the dynamic driving control tasks are automated, and tasks relating to emergency are also processed automatically. The level 5 corresponds to the driving form in which automated driving is possible under practically all the conditions without restriction of places or the like, i.e., corresponds to "fully automated driving".

In the following description, automated driving and advanced driver assistance are collectively referred to as "autonomous travel", and automated driving vehicles and advanced driver assistance vehicles are collectively referred to as "autonomous vehicles." Furthermore, the state where the vehicle does not travel autonomously, that is, the vehicle travels by driving operation performed by a driver, is referred to as "manual travel".

In order to enable the vehicle to travel autonomously, an automated driving controller 26 is mounted on the vehicle. The automated driving controller 26 is a microcomputer including a processor 26a and a memory 26b. The functions of the automated driving controller 26 are implemented when the processor 26a executes programs stored in the memory 26b. The processor 26a refers to a processor in the broad sense. The processor 26a includes a general-purpose processor (such as a central processing unit (CPU)), a dedicated processor (such as a graphics processing unit (GPU), an application specific integrated circuit (ASIC), a field programmable gate array (FPGA), and a programmable logic device). It is not necessary that the automated driving controller 26 is configured with the processor 26a that is physically one device. A plurality of processors physically distanced from each other may configure the processor 26a. Similarly, the memory 26b is not necessarily configured with physically one element either. The memory 26b may be configured with a plurality of memories physically distanced from each other. The memory may also include at least one of a semiconductor memory (such as a RAM, a ROM, and a solid-state drive) and a magnetic disk (such as a hard disk drive).

The automated driving controller 26 controls a powertrain unit 36, a steering unit 38, and a braking unit 40 so as to make the vehicle travel autonomously. The powertrain unit 36 is a unit that provides motive power to wheels. The powertrain unit 36 has a power unit including a drive source (for example, an electric motor, an engine, and a combination of these) that generates travel motive power, and a drive train that transmits the motive power output from the driving source to the wheels. The steering unit 38 transmits force and displacement to a travel device in order to optionally change an advance direction of the vehicle to the right and left directions. The braking unit 40 is a unit made to generate the braking force of the vehicle. The braking unit 40 has an electrically controllable brake actuator. The powertrain unit 36, the steering unit 38, and the braking unit 40 may each have a dedicated controller that can communicate with the automated driving controller 26, or may directly be drive-controlled by the automated driving controller 26.

The vehicle further has a sensor group 34 and a communication IF 35. The sensor group 34 is configured with one or more sensors that detect a travel state and a peripheral environment of the vehicle. The sensor group 34 includes, for example, at least one of a speed sensor, a camera, a millimeter-wave radar, an infrared sensor, LiDAR, an ultrasonic sensor, a GPS sensor, an acceleration sensor, and a gyro sensor. The communication IF 35 exchanges information with information terminals provided outside the vehicle (for example, information terminals mounted in other vehicles, a mobile information terminal possessed by a user, information terminals disposed in a communications center, etc.).

The automated driving controller 26 calculates a target driving force, a target braking force, and a target steering angle necessary for autonomous travel, based on the detection results detected by the sensor group 34 and the information acquired through the communication IF 35. The automated driving controller 26 outputs these calculated values to the powertrain unit 36, the braking unit 40, and the steering unit 38 as request values. The vehicle is equipped with a steering wheel 28, an accelerator pedal 30, and a brake pedal 32 for the driver to operate at the time of manual traveling.

Incidentally, it is sometimes necessary to confirm a driver's intention even during autonomous travel. For example, assume the case where an own vehicle is traveling autonomously following a preceding vehicle. In this case, when the speed of the preceding vehicle is sufficiently lower than a predefined reference speed, and a lane change to a passing lane is possible, it is necessary to confirm the driver's intention regarding the necessity of overtaking. In this case, the vehicle makes an inquiry about the driver's intention. Such an action to confirm the driver's intention during autonomous travel is called an "event".

The vehicle is further mounted with the interface device 10. The interface device 10 presents various pieces of information regarding driving to the driver, and also receives an instruction input from the driver regarding the driving. Although the interface device 10 has various input devices and output devices, only the elements relating to the "event", that is, confirmation of the driver's intention regarding the autonomous travel are described here in particular.

The interface device 10 can roughly be divided into input devices which receive a driver's instruction input, output devices which present various pieces of information to the driver, and an IF controller 12 which controls output of the output devices. The interface device 10 of the present example includes, as an input device, setting switches 14 and paddle shift switches 16. Hereinafter, the term "switch" is abbreviated to "SW". The setting SWs 14 and the paddle shift SWs 16 are each provided in the steering wheel 28. This will be described later. The SWs 14, 16 each output an electrical signal, corresponding to each operation, to the IF controller 12.

The interface device 10 of the present example includes a meter display 20, a head-up display (hereinafter referred to as "HUD") 22, and a speaker or buzzer 24. The meter display 20 and the HUD 22 constitute the display device 18 disposed ahead of the steering wheel 28. The specific configuration and arrangement of the meter display 20 and the HUD 22 will also be described later.

The IF controller 12 is a controller for controlling the output devices. As described later, the IF controller 12 displays an intention confirmation image on the display device 18 (i.e., the meter display 20 and the HUD 22), when confirmation of a driver's intention regarding autonomous travel is necessary. The IF controller 12 is a microcomputer including a processor 12a and a memory 12b. The IF controller 12 may be configured with a single microcomputer, or may be configured with a plurality of microcomputers. The IF controller 12 may be a microcomputer different from the automated driving controller 26, or may be integrated with the automated driving controller 26.

Figure 2:
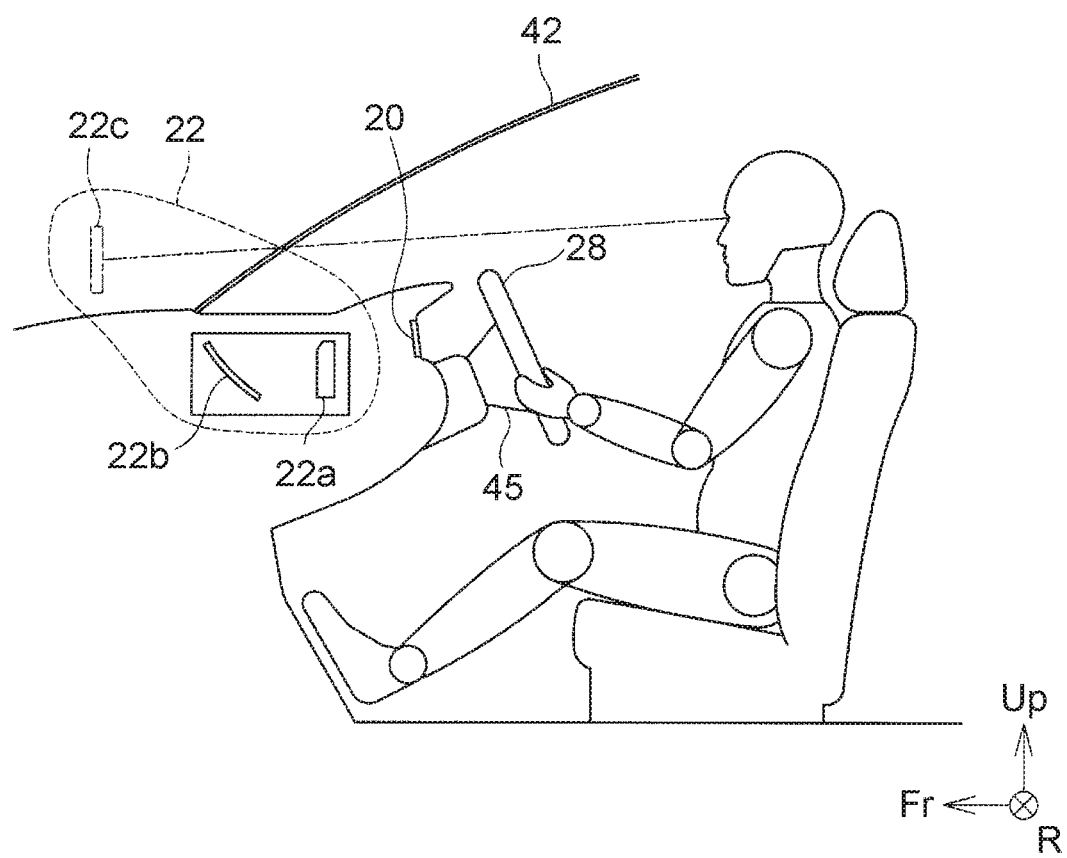
FIG. 2 is a schematic side view showing the periphery of a driver's seat.
Figure 3:
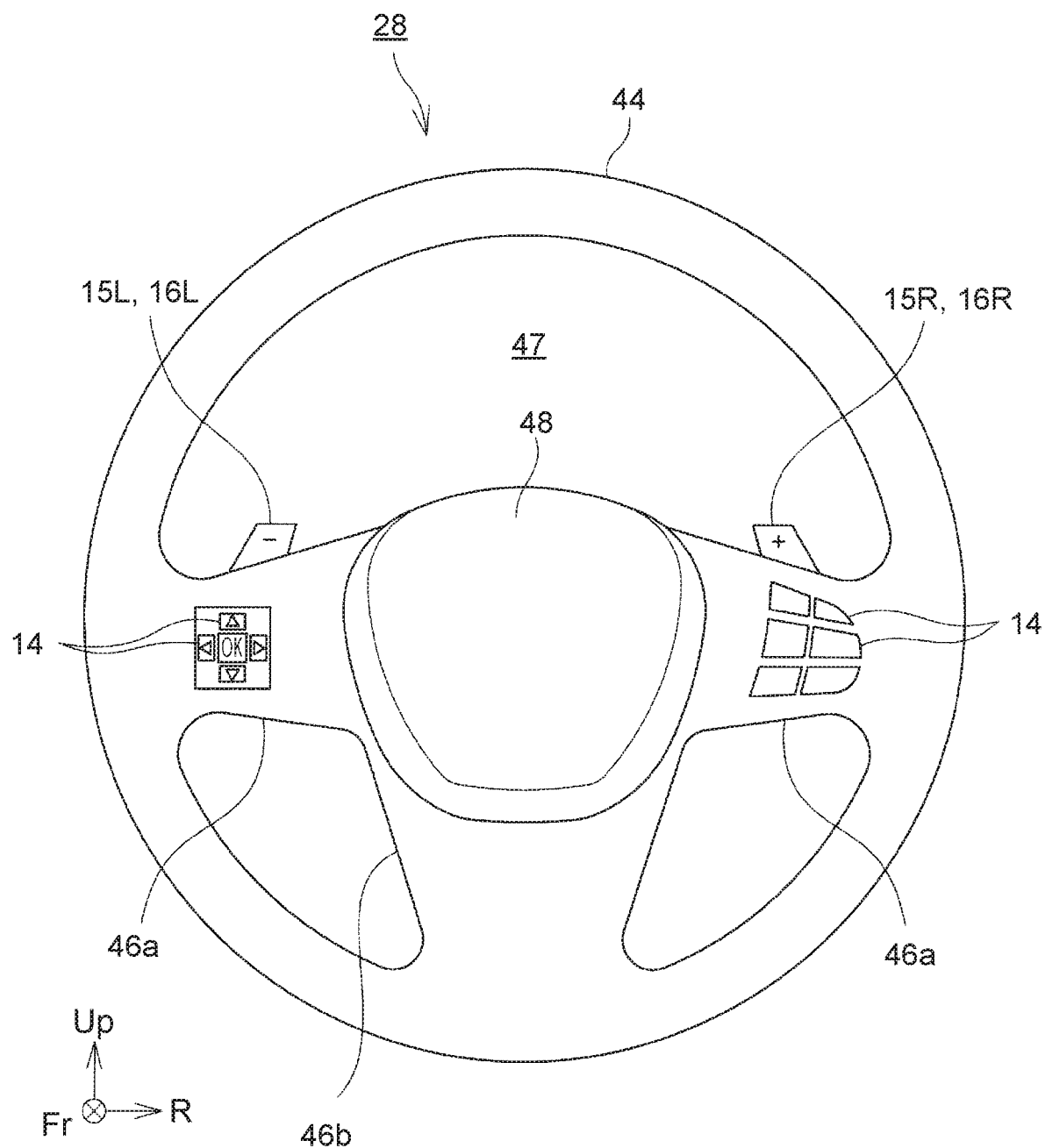
FIG. 3 is a plan view of a steering wheel.
Figure 4:
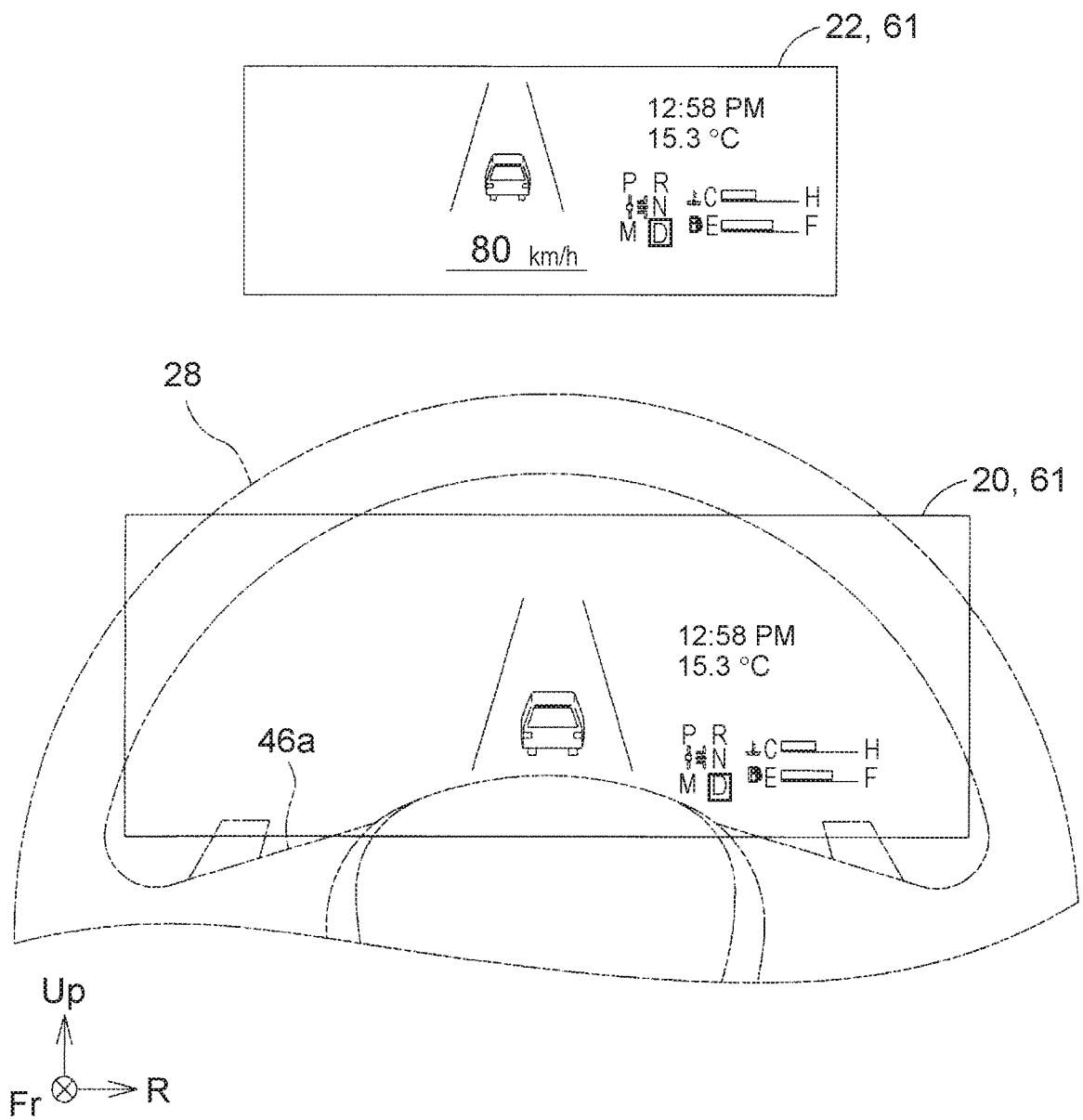
FIG. 4 shows examples of a meter display and an HUD viewed from a driver.

Next, physical arrangement and configuration of the main elements of the interface device 10 will be described with reference to FIGS. 2 to 4. FIG. 2 is a schematic side view showing the periphery of a driver's seat. FIG. 3 is a plan view of the steering wheel 28. FIG. 4 shows examples of the meter display 20 and the HUD 22 viewed from the driver.

As shown in FIG. 2, the steering wheel 28 is provided ahead of the driver's seat as has widely been known. As shown in FIG. 3, the steering wheel 28 includes a round rim 44, a hub 45 positioned at an inner center of the rim 44 (see FIG. 2 as the hub 45 is not shown in FIG. 3), spokes 46a, 46b which connect the rim 44 and the hub 45, and a pad section 48 disposed on the front face of the hub 45. The spokes are composed of a lateral spoke 46a extending in a horizontal direction from the hub 45, and a longitudinal spoke 46b extending downward from the hub 45. The spokes as a whole form a substantial T-shape. Accordingly, a relatively large opening 47 of a semicircular shape is present between an upper half of the rim 44 and the lateral spoke 46a. The driver visually recognizes the meter display 20 through the semicircle opening 47. In the pad section 48, a horn, an airbag, etc. are housed. The driver generally holds a position of 3 o'clock in the steering wheel 28 by a right hand, and a position of 9 o'clock by the left hand.

As shown in FIG. 2, the meter display 20 is disposed ahead of the steering wheel 28. The meter display 20 is a display device that displays at least vehicle speed information. The meter display 20 is built into an instrument panel of the vehicle, and is configured with, for example, a liquid crystal panel or an organic EL panel. The meter display 20 is positioned, as viewed from the driver, behind the semicircle opening 47 of the steering wheel 28, and the driver visually recognizes the meter display 20 through the semicircle opening 47. Therefore, when the driver looks at the meter display 20, an upper end of the lateral spoke 46a appears in the vicinity of the lower end of the meter display 20 as shown in FIG. 4.

The HUD 22 is disposed further ahead of the meter display 20. The HUD 22 is a display device which displays a video image in the air ahead of a transparent reflecting plate. In addition to the transparent reflecting plate, the HUD 22 includes a projector 22a which projects a video image, and an optical member 22b which bends image light. In the present example, as shown in FIG. 2, a windshield glass 42 is used as a transparent reflecting plate of the HUD 22. Accordingly, for the driver, a display image 22c of the HUD 22 appears in the air corresponding to the position that is ahead of (behind) the windshield glass 42 and above the meter display 20 and the steering wheel 28 as shown in FIG. 4. The transparent reflecting plate of the HUD 22 may be provided independently of the windshield glass 42, for exclusive use. In any case, displaying a video image in the air ahead of the transparent reflecting plate enables the driver to visually recognize an aerial image (i.e., the display image 22c) as well as an actual landscape over the aerial image. The information displayed on the HUD 22 may be the same as the information displayed on the meter display 20, or may be different. In the present example, an intention confirmation image 64 (see FIGS. 5 and 6) is displayed on both the meter display 20 and the HUD 22 as described later.

The steering wheel 28 is provided with the setting SWs 14 and the paddle shift SWs 16 in order to receive an operation instruction from the driver. Specifically, from the upper end face of the lateral spoke 46a, two paddle shift SWs 16R, 16L protrude. Hereinafter, the paddle shift SW 16 disposed on the right side of a horizontal center of the steering wheel 28 is referred to as a "right paddle shift SW 16R", and the paddle shift SW 16 disposed on the opposite side of the horizontal center of the steering wheel 28 from the right paddle shift SW 16R is referred to as a "left paddle shift SW 16L". As shown in FIG. 3, the right paddle shift SW 16R and the left paddle shift SW 16L are symmetrically disposed with respect to the horizontal center of the steering wheel 28.

From another point of view, when the driver puts the right hand on the position of generally three o'clock of the steering wheel 28 and the left hand on the position of generally nine o'clock, the right paddle shift SW 16R is disposed at the position where it is easy to operate by the right hand and hard to operate by the left hand, and the left paddle shift SW 16L is disposed at the position where it is easy to operate by the left hand and hard to operate by the right hand.

The two paddle shift SWs 16R, 16L are used for shift change or change of regeneration level at the time of manual traveling. Specifically, when the right paddle shift SW 16 is pressed, the vehicle is in an upshift situation or an upshift-like situation due to decrease in the regeneration level. When the left paddle shift SW 16L is pressed, the vehicle is in a downshift situation or a downshift-like situation due to increase in the regeneration level. A mark "+" for reminding of the upshift is given to the surface of the right paddle shift SW 16R, and a mark "−" for reminding of the downshift is given to the surface of the left paddle shift SW 16L. The right paddle shift SW 16R and the left paddle shift SW 16L also function as a right operation SW 15R and a left operation SW 15L for responding to an inquiry from the vehicle side, at the time of the event for confirming the intention of the driver regarding autonomous travel. This will be described later.

A plurality of setting switches 14 is provided on the front face of the lateral spoke 46a. The setting SWs 14 are switches used for operation of interior electronic devices (for example, an audio device, an air-conditioner, a navigation device) and setting operation (for example, setting of maximum permissible speed, destination, etc.) regarding autonomous travel.

Figure 5:
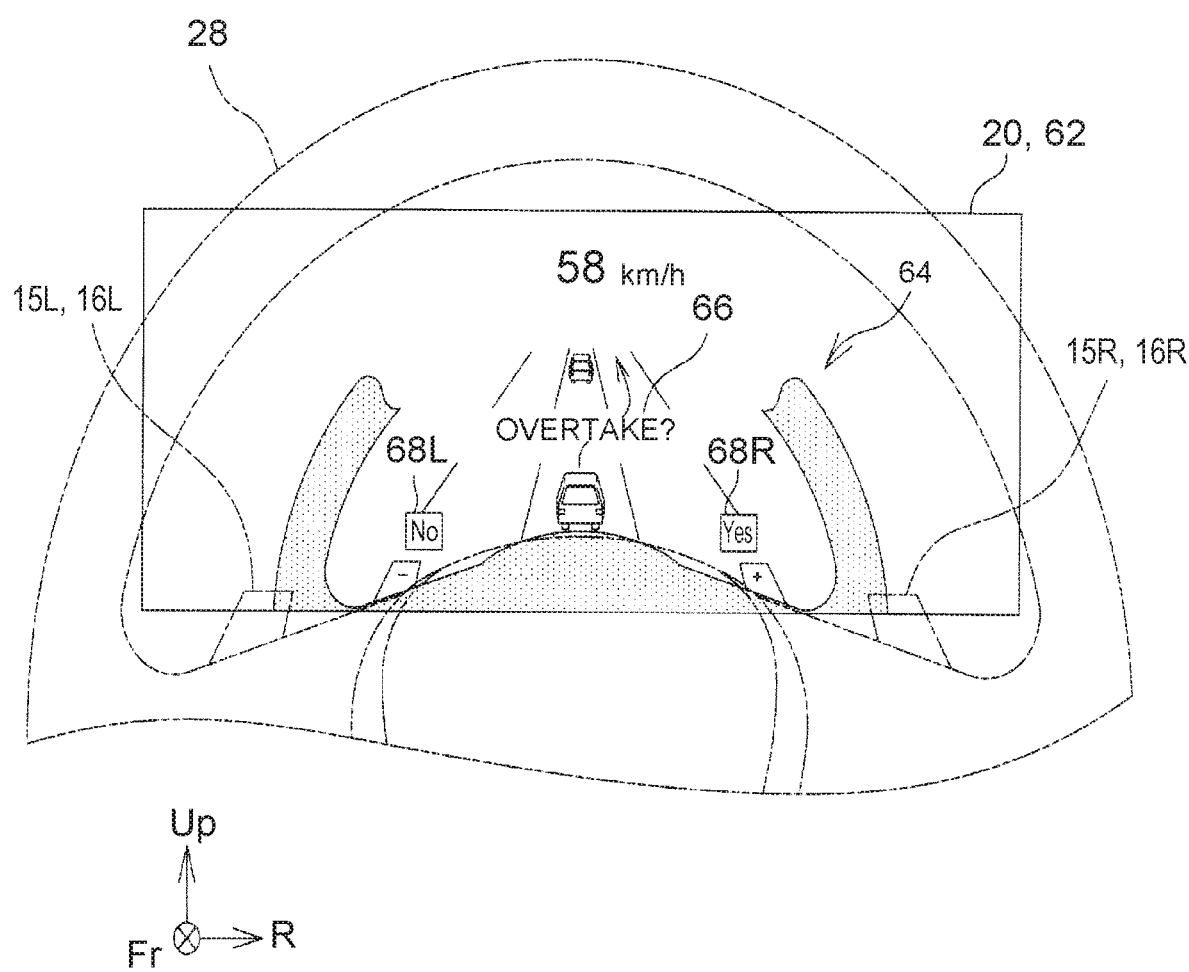
FIG. 5 is an image view of the meter display during an event.

Next, the behavior of the interface device 10 during the event will be described with reference to FIGS. 5 and 6. FIG. 5 is an image view of the meter display 20 during the event. FIG. 6 shows image views of the meter display 20 and the HUD 22 during the event.

As described before, even during autonomous travel, there are cases where an "event" that requires confirmation of the driver's intention occurs. As shown in FIG. 6, the interface device 10 displays the intention confirmation image 64 to confirm the driver's intention during the event. The intention confirmation image 64 includes an inquiry image 66, a right guide image 68R, a left guide image 68L, a wheel image 70, a right SW image 72R, and a left SW image 72L.

The inquiry image 66 is an image indicating the content of an inquiry in an alternative form to the driver. The inquiry image 66 generally includes a character string indicating the content of the inquiry. In the example shown in the drawing, the inquiry image 66 includes a character string "Overtake?" for inquiring the necessity of overtaking. The inquiry image 66 is displayed at an appropriate position where the intention is easy to understand, such as the vicinity of the center of the respective meter display 20 and HUD 22.

The right guide image 68R is an image indicating a choice selectable with the right paddle shift SW 16R (right operation SW 15R). The right guide image 68R generally includes a character string indicating the choice. In the example of the drawing, the right guide image 68R includes a character string "Yes" which indicates a positive choice. The right guide image 68R is displayed on the right side of the horizontal center of the inquiry image 66, and more specifically, in the vicinity of the later-described right SW image 72R.

The left guide image 68L is an image indicating a choice selectable with the left paddle shift SW 16L (left operation SW 15L). The left guide image 68L generally includes a character string indicating the choice. In the example of the drawing, the left guide image 68L includes a character string "No" which indicates a negative choice. The left guide image 68L is displayed on the left side of the horizontal center of the inquiry image 66, and more specifically, in the vicinity of the later-described left SW image 72L. In other words, the right guide image 68R and the left guide image 68L are symmetrically displayed with a horizontal center line of the inquiry image 66 as an axis of symmetry.

Thus, with a horizontal center of the inquiry image 66 as a reference, the right guide image 68R indicating a choice selectable with the right operation SW15R is displayed on the right side, and the left guide image 68L indicating a choice selectable with the left operation SW15L is displayed on the left side. This makes it easier for the driver to intuitively understand the correspondence between the right and left operation SWs 15R, 15L and two choices. As a result, the driver can certainly and correctly respond to the inquiry from the vehicle side.

The wheel image 70 is an image of at least some part of the steering wheel 28. In the example of the drawing, the wheel image 70 is an image corresponding to the vicinity of an upper end of the lateral spoke 46a and some part of the rim 44. The wheel image 70 may be an image reminding of the steering wheel 28, such as a silhouette image of the steering wheel 28, or a deformed image of the steering wheel 28.

The right SW image 72R and the left SW image 72L are images indicating the right operation SW 15R (right paddle shift SW 16R) and the left operation SW 15L (left paddle shift SW 16L). The right SW image 72R and the left SW image 72L are displayed in portions of the wheel image 70 corresponding to the upper end of the lateral spoke 46a, like the actual right operation SW 15R and left operation SW 15L. The mark of "+" or "−" is also given to the right SW image 72R and the left SW image 72L, like the actual right operation SW 15R and left operation SW 15L.

As described before, the right guide image 68R is disposed in the vicinity of the right SW image 72R, and the left guide image 68L is disposed in the vicinity of the left SW image 72L. With this configuration, the driver can grasp intuitively the position of the switches to operate in order to choose the choice indicated by the guide images 68R, 68L. As a result, the driver can understand more intuitively the correspondence between the right and left operation SWs 15R, 15L, and two choices, and can respond more certainly and correctly to the inquiry from the vehicle side.

The right SW image 72R and the left SW image 72L may be highlighted in contrast with the wheel image 70. Highlighting is a display mode for attracting a user's attention. For example, the SW images 72R, 72L may be displayed with luminance higher than the wheel image 70, or may be flashed. A size ratio of the SW images 72R, 72L to the wheel image 70 may be set larger than the size ratio of the operation SWs 15R, 15L to the actual steering wheel 28. In any case, highlighting the SW images 72R, 72L enables the driver to more certainly understand the position of the switches that is to be operated for the inquiry.

A base image indicating the travel state of the vehicle is also displayed on the meter display 20 and the HUD 22. The aforementioned intention confirmation image 64 is displayed on top of the base image. The content of such a base image may be switched based on the presence or absence of an event. For example, as shown in FIG. 4, in the state where no event occurs, a stationary image 61 may be displayed as the base image. When an event occurs, an event image 62 may be displayed as the base image as shown in FIG. 6. For example, the stationary image 61 may include information, such as vehicle speed and travel state, as well as time, ambient temperature, coolant temperature, and remaining fuel. Meanwhile, the event image 62 may properly be changed in accordance with the content of the event. For example, at the time of an event for inquiring the necessity of overtaking a preceding vehicle, the event image 62 may include an illustration expressing overtaking. In any case, when the base image is changed from the stationary image 61 to the event image 62 at the time when the event occurs, the driver can recognize the occurrence of the event more certainly. At the time of the occurrence of the event, an alarm sound or voice guidance that alerts the driver may be output from the speaker or buzzer 24.

Description is now given of the reason why the two operation SWs 15R, 15L (i.e., the paddle shift SWs 16R, 16L) are used for responding to the inquiry regarding autonomous travel as described above. The conventional interface device 10 often responds to the inquiry regarding autonomous travel with the setting switches 14. For example, as shown in FIG. 7, there are cases where a direction switch 74 and an OK switch 76 which are kinds of the setting switches 14 are used to respond to the inquiry regarding autonomous travel. In this case, an inquiry sentence 78a, a choice list 78b, and a cursor 78c that is movable in the list 78b are displayed on the display device 18 such as the meter display 20 as shown in FIG. 7. The driver operates the direction switch 74 to move the cursor 78c to a desired choice, and presses the OK switch 76 to determine the choice. Such an operation system can be used for the inquiry in the alternative form, as well as for more complicated inquiries and settings. Therefore, the operation system using the direction switch 74 and the OK switch 76 can also be used for, for example, operation to set a destination, operation to set a speed limit at the time of autonomous travel, and the like.

However, in this case, since operating procedures are complicated, the driver needs to learn the operating procedures by reading a manual in advance or the like. Since the direction switch 74 and the OK switch 76 are disposed adjacent to each other, it is necessary to pay attention to operation mistake attributed to erroneous pressing. Furthermore, since the direction switch 74 and the OK switch 76 are disposed adjacent to each other, they tend to be relatively small switches. Accordingly, their operating load and operating stroke tend to be small. Therefore, it may be necessary to pay attention to operation through temporal visual recognition of the switches or the like.

Here, an inquiry to the driver from the vehicle during autonomous travel is often an inquiry relating to the travel behavior of the vehicle, and is often very important. An operation system used for responding to such an inquiry is required to be the operation system that the driver can surely operate and that hardly causes an erroneous operation even when the driver does not learn how to operate in advance.

In the present example, a response to an inquiry in the alternative form is made with the two operation SWs 15R, 15L disposed separate from each other in the horizontal direction as described before. In short, a choice and a switch corresponding to the choice is in one-to-one relationship. Furthermore, the guide images 68R, 68L corresponding to the respective operation SWs 15R, 15L are displayed in an arrangement relating to an actual arrangement of the operation SWs 15R, 15L. As a result, the driver can intuitively recognize the correspondence between each of the operation SWs 15R, 15L, and choices, and surely operate the switches even when the driver does not learn how to operate in advance.

As is clear from the description in the foregoing, since the operation SWs 15R, 15L are disposed separate from each other in the horizontal direction, erroneous pressing is less likely to occur than in the case of the setting SWs 14. Particularly, the right operation SW 15R is provided in an area where it is easy to operate by the right hand and hard to operate by the left hand, and the left operation SW 15L is provided in an area where it is easy to operate by the left hand and hard to operate by the right hand. In short, since the right operation SW 15R and the left operation SW 15L are operated by the different hands, erroneous pressing is less likely to occur. Since the right paddle shift SW 16R and the left paddle shift SW 16L which are the right operation SW 15R and the left operation SW 15L have a larger size than the setting SWs 14, their operating load and operating stroke are also large. As a result, even when fingers accidentally touch the paddle shift SWs 16R, 16L, they are less likely to be pressed.

Furthermore, although the paddle shift SWs 16R, 16L are essentially provided for shift change or instruction to change the regeneration level, the shift change and the instruction to change the regeneration level is unnecessary at the time of autonomous travel. Using these paddle shift SWs 16R, 16L for responding to the inquiry at the time of autonomous travel can eliminate the necessity of providing a new switch and can thereby achieve cost reduction.

Figure 8:
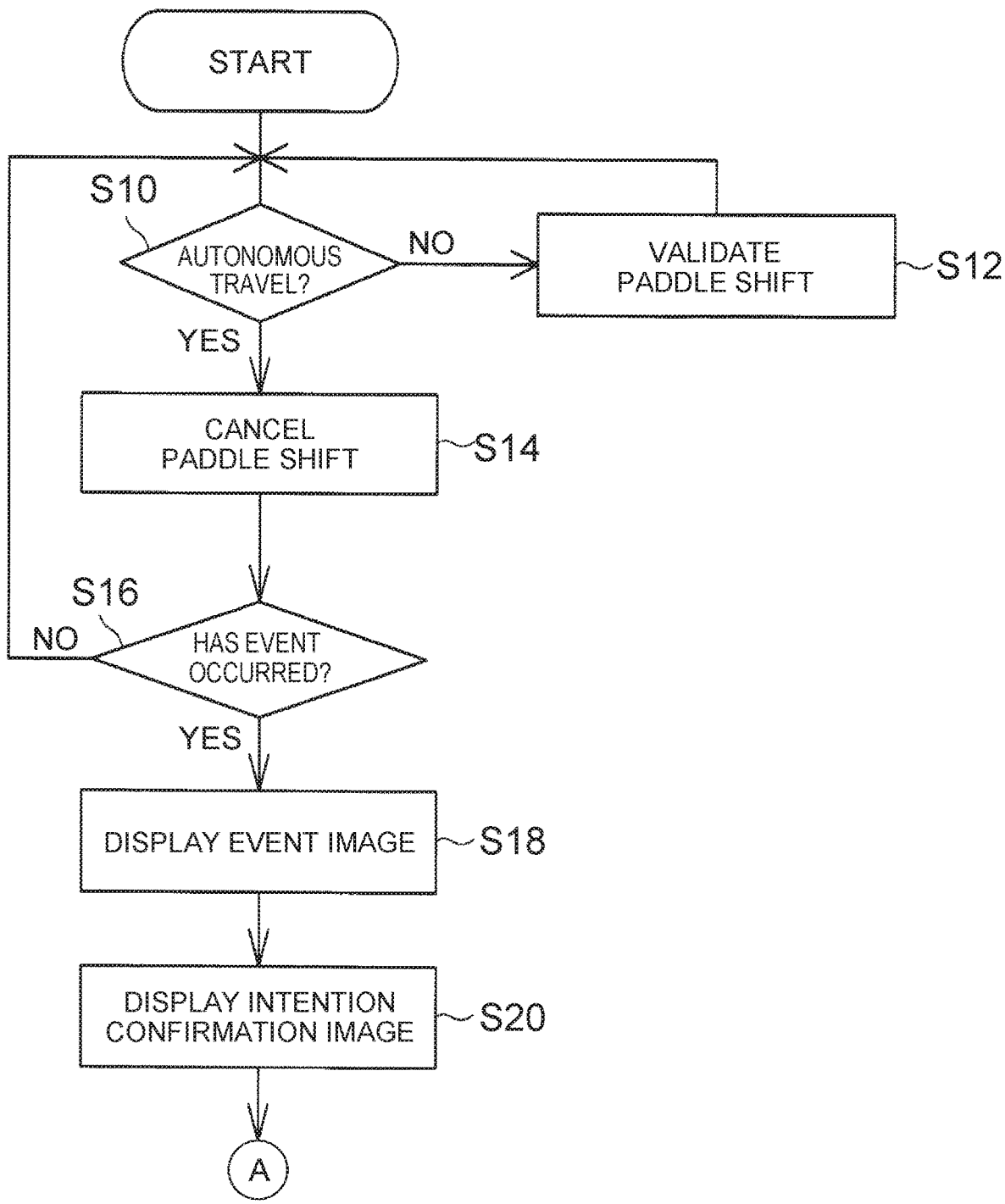
FIG. 8 is a flowchart showing a process flow of an interface device during an event.
Figure 9:
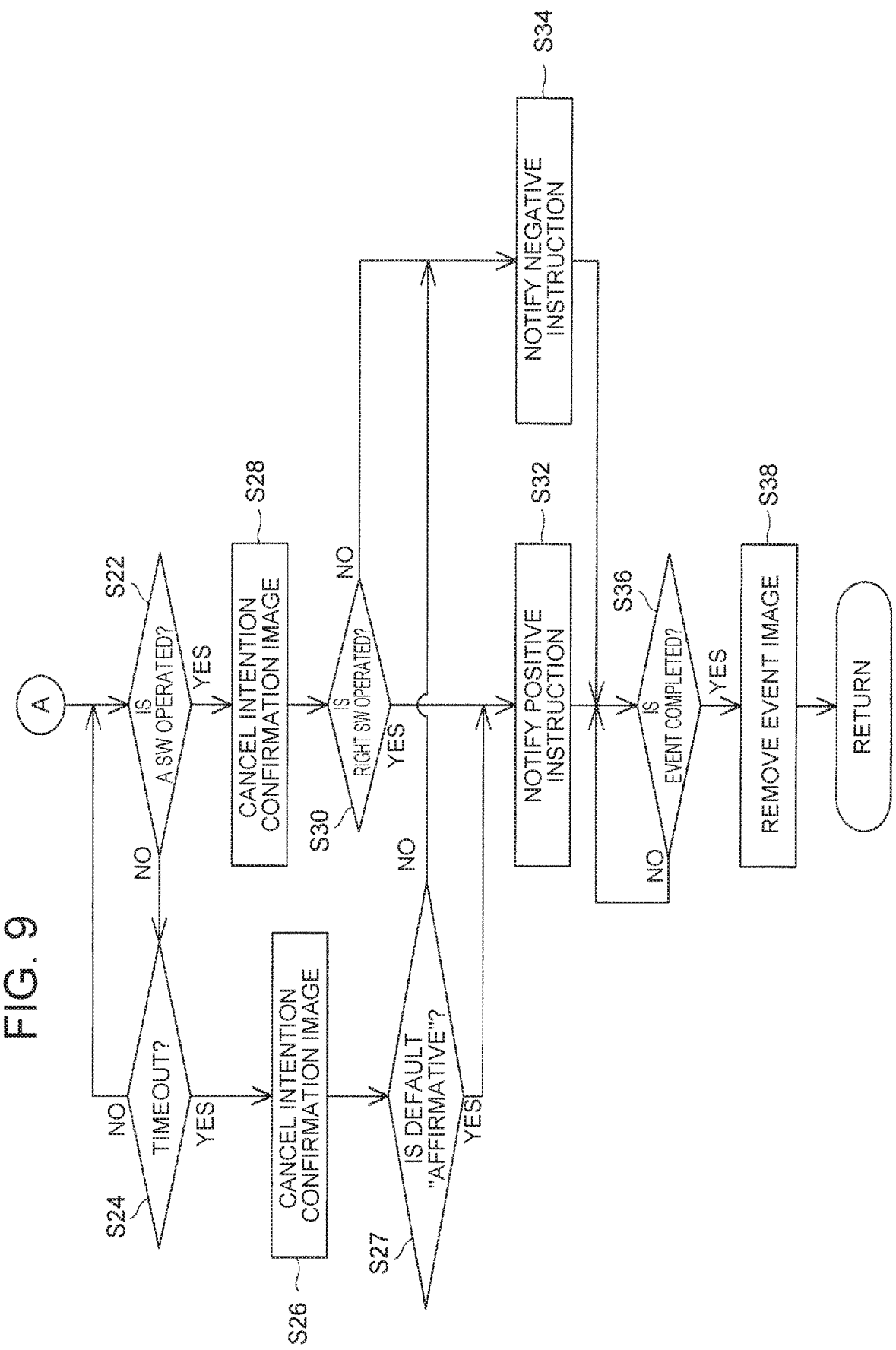
FIG. 9 is a flowchart showing a process flow of the interface device during the event.

Next, the process flow of the interface device 10 during an event will be described with reference to FIGS. 8 and 9. As shown in FIG. 8, the interface device 10 periodically confirms whether the vehicle is in autonomous travel (S10). When the vehicle is in manual travel instead of the autonomous travel, the IF controller 12 validates the shift change by the paddle shift SWs 16 (S12). Meanwhile, when the vehicle is in autonomous travel, the IF controller 12 cancels the shift change by the paddle shift SWs 16 (S14). Therefore, even when the driver operates the paddle shift SWs 16 during autonomous travel, shift change is not executed. Instead, the automated driving controller 26 controls gear shift of the vehicle. The shift change function may be validated during autonomous travel, as long as it is cancelled at least during a period when the intention confirmation image 64 is displayed.

Next, the IF controller 12 confirms whether or not an inquiry regarding autonomous travel is received from the automated driving controller 26, i.e., whether or not an event has occurred (S16). When no event occurs, the IF controller 12 returns to step S10. When an event has occurred, the IF controller 12 switches the base image of the display device 18 to the event image 62 (S18). The IF controller 12 further displays the intention confirmation image 64 on the display device 18 (S20). Thus, when the display information of the display device 18 is changed, the driver can recognize that an inquiry is generated at the vehicle side. In order for the driver to recognize generation of the inquiry more clearly, the intention confirmation image 64 may be displayed as animation. For example, slide-in display in which the intention confirmation image 64 moves to a final display position from out of the frame of the display device, turn-display in which the intention confirmation image 64 is turned in at an early state of display, or the like, may be performed. An alarm sound and a voice guidance may be output in conjunction with the intention confirmation image 64. With such configuration, the driver can recognize the generation of an inquiry more certainly.

Next, the IF controller 12 confirms the presence or absence of operation of the right and left operation SWs 15R, 15L (i.e., the paddle shift SWs 16R, 16L) (S22). When one of the operation SWs 15 (paddle shift SWs 16) is operated in a predefined time limit (for example, several seconds) (Yes in S22), the IF controller 12 cancels the display of the intention confirmation image 64 (S28).

When the driver operates the right operation SW 15R (right paddle shift SW 16R) (Yes in S30), the IF controller 12 determines that the driver inputs a positive instruction, and notifies the positive instruction to the automated driving controller 26 (S32). In this case, the automated driving controller 26 executes a positive action. For example, when the content of the inquiry is "overtake?", the automated driving controller 26 executes an overtaking operation as the positive action.

When the right operation SW 15R is not operated although one of the operation SWs 15 is operated, i.e., Yes in S22 and No in S30, it means that the left operation SW 15L (left paddle shift SW 16L) is operated. In this case, the IF controller 12 determines that the driver inputs a negative instruction, and notifies the negative instruction to the automated driving controller 26 (S34). In this case, the automated driving controller 26 executes the negative action. For example, when the content of the inquiry is "overtake?", the automated driving controller 26 continues travel of the vehicle following the preceding vehicle without overtaking the preceding vehicle, as the negative action.

When both the right and left operation SWs 15R, 15L are not operated within the time limit (Yes in S24), the IF controller 12 determines that the driver selects a preset default choice. Therefore, when there is no operation within the time limit (Yes in S24), the IF controller 12 cancels the display of the intention confirmation image 64 (S26), and then confirms the default choice (S27). When the default choice is "positive" (it is Yes at S27), the IF controller 12 determines that the positive instruction is input, and notifies the positive instruction to the automated driving controller 26 (S32). Meanwhile, when the default choice is "negation" (No in S27), the IF controller 12 determines that negative instruction is input, and notifies the negative instruction to the automated driving controller 26 (S34). The system may determine and define such setting of the default choices for every item, or the driver may freely change the setting.

When the inquiry to the driver is completed (S36), that is, when the event is completed, the IF controller 12 cancels the display of the event image 62 (S38), and returns to S10.

As is clear from the above description, the interface device 10 disclosed in the present specification enables the driver to intuitively understand the correspondence between the choices for an inquiry from the vehicle side and the right and left operation SWs 15R, 15L. Accordingly, the driver can correctly respond even when the driver does not learn how to operate in advance. Moreover, when the paddle shift SWs 16R, 16L originally mounted on the vehicle are used as the operation SWs 15R, 15L for inputting an instruction regarding autonomous travel, the necessity of providing a new switch is eliminated, which makes it possible to reduce manufacturing costs.

Figure 10:
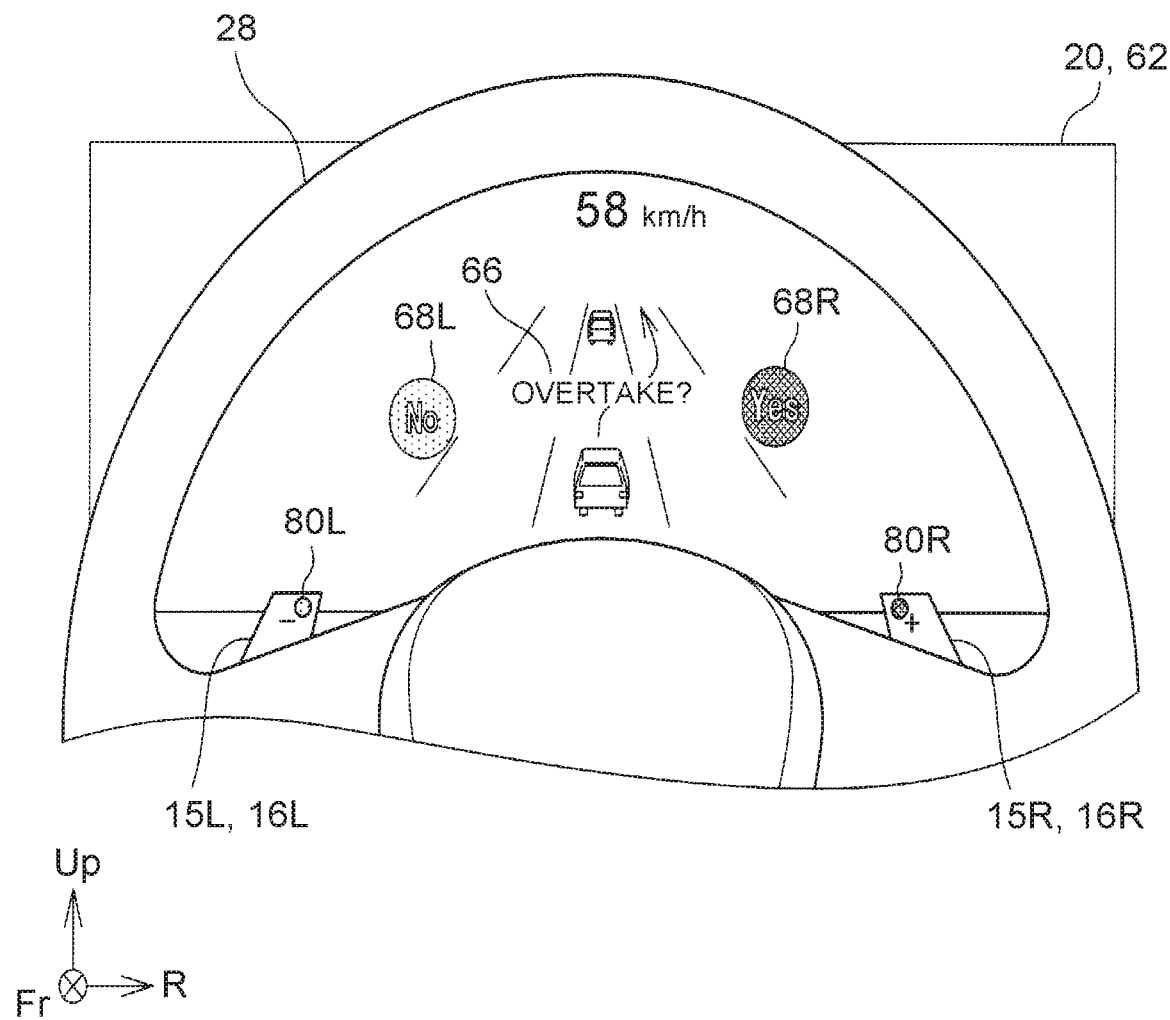
FIG. 10 shows an example of another intention confirmation image.

The configuration described so far is merely an example, and other configurational aspects may properly be changed, as long as the two right and left operation SWs 15R, 15L are provided on the steering wheel 28 for responding to an inquiry in the alternative form regarding autonomous travel, and the inquiry image 66, and the right guide image 68R positioned on the right side and the left guide image 68L positioned on the left side with the horizontal center line of the inquiry image 66 as a reference are displayed on the display device. For example, in the description so far, the intention confirmation image 64 includes the inquiry image 66 and the guide images 68R, 68L, as well as the wheel image 70 and the SW images 72R, 72L. However, as shown in FIG. 10, the wheel image 70 and the SW images 72R, 72L may be omitted.

In order for the driver to understand the correspondence between each of the operation SWs 15R, 15L and the choices more clearly, auxiliary light sources may be provided on the operation SWs 15R, 15L, the auxiliary light sources being lit in conjunction with the display of the intention confirmation image 64 and emitting light different in color from each other. In this case, the right guide image 68R and the left guide image 68L include images depicted in colors identical to the auxiliary light sources mounted on the corresponding operation SWs 15R, 15L, respectively. For example, in the example of FIG. 10, a blue right LED 80R is mounted on the right operation SW 15R, and a red left LED 80L is mounted on the left operation SW 15L. When displaying the intention confirmation image 64, the IF controller 12 continuously or intermittently light the right LED 80R and the left LED 80L. In this case, the right guide image 68R includes an image depicted in colors with blue tones, and the left guide image 68L may include an image depicted in colors with red tones. Although not illustrated, the LEDs 80R, 80L may further be formed into a shape representing a character string (for example, "Yes" and "No") instead of a simple round shape. With this configuration, the driver can more clearly understand the correspondence between each of the operation SWs 15R, 15L and the choices.

Figure 11:
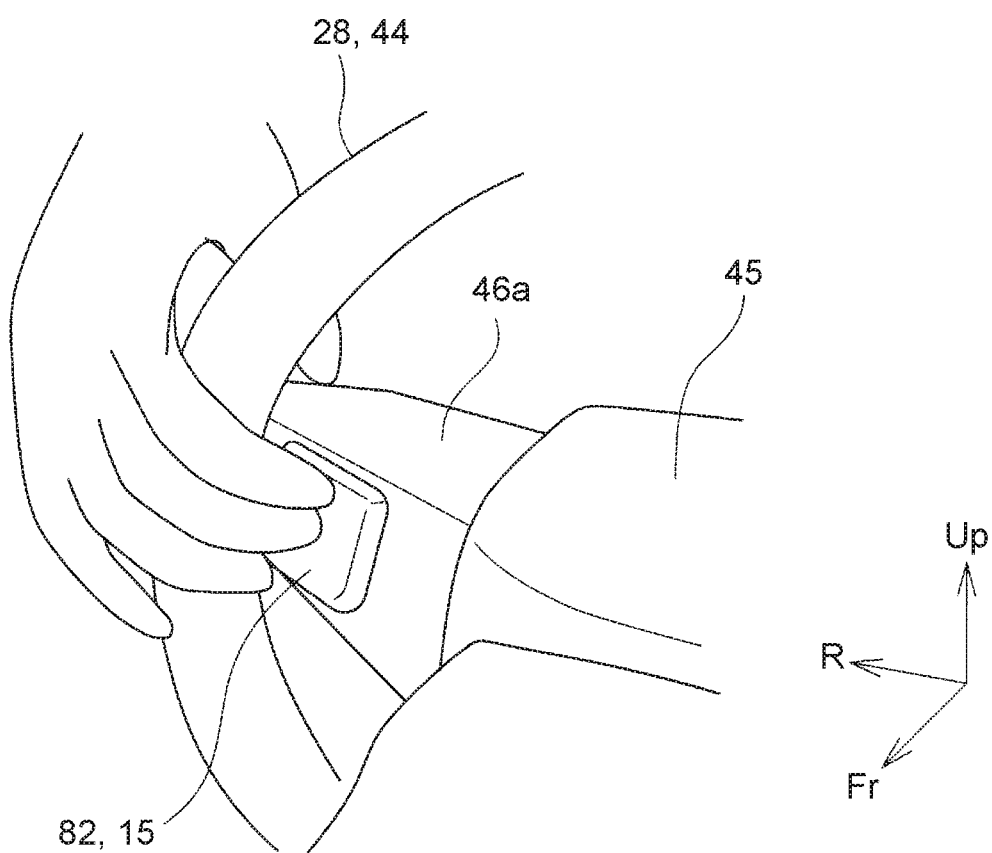
FIG. 11 shows an example of another operation switch.
Figure 12:
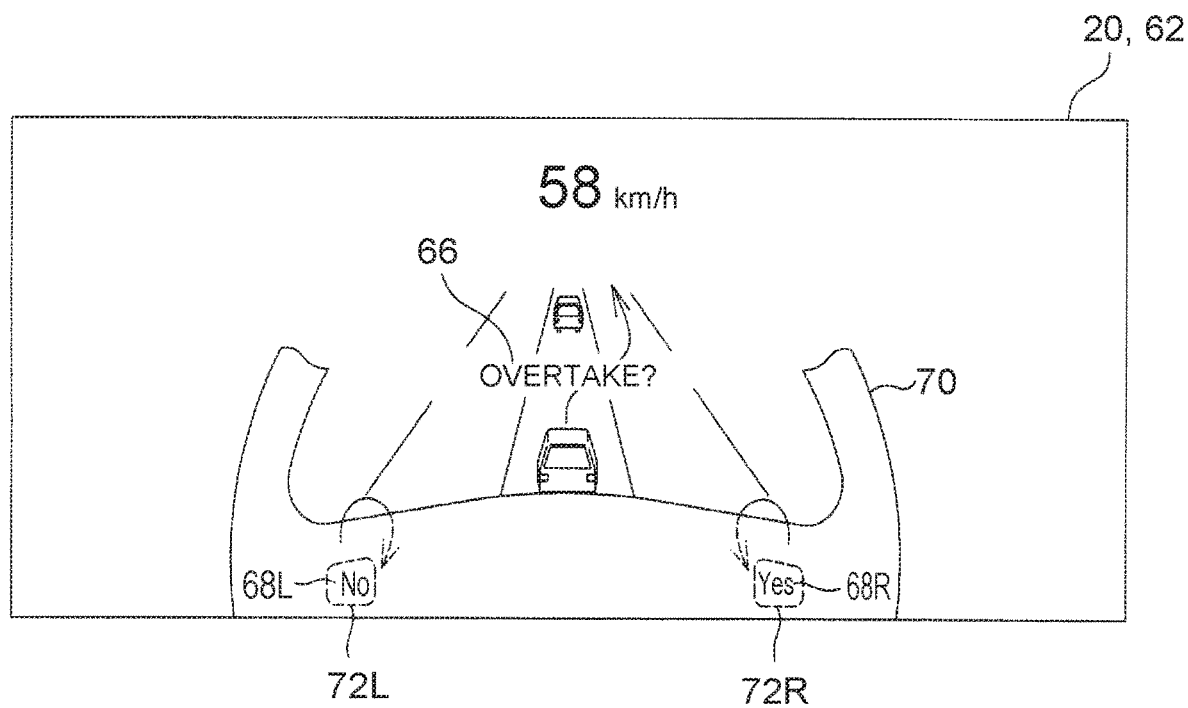
FIG. 12 shows an example of an intention confirmation image at the time of using the operation switch of FIG. 11.

In the description in the foregoing, the paddle shift SWs 16R, 16L are used as the operation SWs 15R, 15L. However, the operation SWs 15R, 15L may be switches other than the paddle shift SWs 16R, 16L. For example, as shown in FIG. 11, back surface switches 82 may be provided on the back surface of the lateral spoke 46a, and the back surface switches 82 may be used as the operation SWs 15R, 15L. Although only a right back surface switch 82 is illustrated in FIG. 11, the similar back surface switch 82 is also present on the left side in actuality. Since it is easier to dispose the back surface switches 82 in the vicinity of the rim 44 than the paddle shift SWs 16, the driver can more easily reach the fingers to the back surface switches 82 without largely moving the hands than in the case of the paddle shift SWs 16. This makes it possible to reduce the operating load. When the back surface switches 82 are used as the operation SWs 15R, 15L, the intention confirmation image 64 may include arrow marks, or the like, to show that the switches are present on the back surface of the spokes and that the switches are to be pressed in a proximal direction as shown in FIG. 12.

In the above description, when the operation SWs 15R, 15L are operated, an action corresponding to the operation is immediately conducted. However, after the operation SWs 15R, 15L are operated, the necessity of canceling the corresponding operation may be inquired. For example, a second intention confirmation image that inquires the necessity of canceling the previous operation may be displayed between step S28 and step S30 of FIG. 9. In this case, the inquiry image of the second intention confirmation image includes, for example, a character string "cancel operation?". When the driver who looked at the second intention confirmation image performs a positive operation, the process may return to step S18, and when the drive performs a negative operation, the process may proceed to step S30. When both the right and left operation SWs 15R, 15L are not operated within the time limit after the second intention confirmation image is displayed, an action corresponding to the previous operation may be executed.

What is claimed is:

1. An in-vehicle interface device, to be mounted in a vehicle that is able to perform autonomous travel that is to travel while controlling at least steering and acceleration and deceleration on a vehicle side, the in-vehicle interface device comprising:
    a right operation switch provided on a steering wheel, the right operation switch being disposed on a right side of a center of the steering wheel in a vehicle width direction at a time of viewing a front side of the vehicle from a vehicle cabin;
    a left operation switch disposed on a left side of the center of the steering wheel;
    one or more display devices disposed ahead of the steering wheel; and
    an interface controller configured to control the one or more display devices, the interface controller being configured to cause the display devices to display an intention confirmation image when it is necessary to confirm a driver's intention regarding the autonomous travel, wherein the intention confirmation image includes
    an inquiry image indicating a content of an inquiry to the driver in an alternative form,
    a right guide image displayed on a right side of a horizontal center of the inquiry image, the right guide image indicating a choice selectable with the right operation switch, and
    a left guide image displayed on a left side of the horizontal center of the inquiry image, the left guide image indicating a choice selectable with the left operation switch,
    wherein the right operation switch and the left operation switch are paddle shift switches operated when shift change is performed.

2. The in-vehicle interface device according to claim 1, wherein the inquiry image, the right guide image, and the left guide image each include a character string indicating the corresponding content of the inquiry or the corresponding choice.

3. The in-vehicle interface device according to claim 1, wherein:
    the intention confirmation image further includes
    a wheel image indicating at least some part of the steering wheel, and
    a right switch image and a left switch image indicating the right operation switch and the left operation switch provided on the steering wheel, respectively; and
    the right guide image is displayed so as to be positioned on a same side of the right switch image, and the left guide image is displayed so as to be on a same side of the left switch image, with the steering wheel being viewed from a front side of the steering wheel.

4. The in-vehicle interface device according to claim 3, wherein the right switch image and the left switch image are highlighted in contrast with the wheel image.

5. The in-vehicle interface device according to claim 1, wherein the in-vehicle interface device cancels a function of the shift change by operation of the right operation switch and the left operation switch at least during a period when the intention confirmation image is displayed.

6. The in-vehicle interface device according to claim 1, wherein:
the steering wheel includes
a round rim,
a hub located at a center of the rim, and
a lateral spoke extending in a horizontal direction from the hub and connecting to the rim; and
the right operation switch and the left operation switch are disposed on a back surface of the lateral spoke.

7. The in-vehicle interface device according to claim 1, wherein:
the right operation switch and the left operation switch are mounted with auxiliary light sources that are lit in colors different from each other;
the interface controller lights the auxiliary light sources in parallel with displaying the intention confirmation image; and
the right guide image and the left guide image include images depicted in colors identical to the auxiliary light sources mounted on the corresponding operation switches, respectively.

8. A vehicle, comprising:
an automated driving controller configured to control at least steering and acceleration and deceleration of the vehicle; and
an in-vehicle interface device configured to receive an instruction input from a driver, wherein:
the in-vehicle interface device includes
a right operation switch provided on a steering wheel, the right operation switch being disposed on a right side of a center of the steering wheel in a vehicle width direction at a time of viewing a front side of the vehicle from a vehicle cabin,
a left operation switch disposed on a left side of the center of the steering wheel,
one or more display devices disposed ahead of the steering wheel, and
an interface controller configured to control the one or more display devices, the interface controller being configured to cause the display devices to display an intention confirmation image when it is necessary to confirm a driver's intention regarding an autonomous travel; and
the intention confirmation image includes
an inquiry image indicating a content of an inquiry to the driver in an alternative form,
a right guide image displayed on a right side of a horizontal center of the inquiry image, the right guide image indicating a choice selectable with the right operation switch, and
a left guide image displayed on a left side of the horizontal center of the inquiry image, the left guide image indicating a choice selectable with the left operation switch,
wherein the right operation switch and the left operation switch are paddle shift switches operated when shift change is performed.

* * * * *